United States Patent
Togashi (10) Patent No.: US 11,460,871 B2
(45) Date of Patent: Oct. 4, 2022

(54) ELECTRONIC DEVICE AND CONTROL METHOD FOR GENERATING AN OUTPUT VOLTAGE FROM AN INPUT VOLTAGE

(71) Applicant: CANON KABUSHIKI KAISHA, Tokyo (JP)

(72) Inventor: Go Togashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 40 days.

(21) Appl. No.: 17/028,017

(22) Filed: Sep. 22, 2020

(65) Prior Publication Data
US 2021/0089064 A1    Mar. 25, 2021

(30) Foreign Application Priority Data
Sep. 24, 2019 (JP) ............... JP2019-173406

(51) Int. Cl.
| | | |
|---|---|---|
| G05F 1/12 | (2006.01) | |
| H02M 3/07 | (2006.01) | |
| G05F 1/565 | (2006.01) | |
| H02M 1/00 | (2006.01) | |

(52) U.S. Cl.
CPC ............... *G05F 1/12* (2013.01); *H02M 3/07* (2013.01); *G05F 1/565* (2013.01); *H02M 1/007* (2021.05)

(58) Field of Classification Search
CPC ............ G05F 1/12; G05F 1/563; H02M 3/07; H02M 2001/007
USPC ............................. 363/62; 323/272, 282–285
See application file for complete search history.

(56) References Cited

U.S. PATENT DOCUMENTS

| | | | | |
|---|---|---|---|---|
| 5,245,520 A | * | 9/1993 | Imbertson | H02M 3/337 363/132 |
| 5,463,542 A | * | 10/1995 | Okamoto | H02M 3/07 307/110 |
| 6,977,488 B1 | * | 12/2005 | Nogawa | H02M 3/1582 323/222 |
| 7,320,405 B2 | * | 1/2008 | Stahl | B65D 21/046 206/509 |
| 10,075,080 B1 | * | 9/2018 | Scoones | H02M 3/1588 |
| 10,263,513 B2 | * | 4/2019 | Villar Piqué | H02M 3/07 |
| 10,686,371 B1 | * | 6/2020 | Lee | G05F 1/575 |
| 2005/0017699 A1 | * | 1/2005 | Stanley | H02M 7/219 323/282 |
| 2009/0058505 A1 | * | 3/2009 | Yoshio | H01M 10/46 327/535 |
| 2011/0128761 A1 | | 6/2011 | Ripley et al. | |
| 2011/0128762 A1 | | 6/2011 | Ripley et al. | |

(Continued)

FOREIGN PATENT DOCUMENTS

| | | | | |
|---|---|---|---|---|
| EP | 3396834 A1 | * | 10/2018 | H02M 1/08 |
| EP | 3654512 A1 | * | 5/2020 | G06F 1/28 |

(Continued)

*Primary Examiner* — Thienvu V Tran
*Assistant Examiner* — Nusrat Quddus
(74) *Attorney, Agent, or Firm* — Cowan, Liebowitz & Latman, P.C.

(57) ABSTRACT

An electronic device includes a first voltage conversion unit that divides an input voltage and outputs the divided voltage, a detection unit that detects the input voltage, and a control unit that controls the voltage division ratio of the first voltage conversion unit such that the output voltage of the first voltage conversion unit decreases as the input voltage increases.

19 Claims, 5 Drawing Sheets

(56) References Cited

U.S. PATENT DOCUMENTS

| | | | | |
|---|---|---|---|---|
| 2012/0307526 A1* | 12/2012 | Senanayake | ......... | H02M 3/158 363/16 |
| 2013/0163302 A1* | 6/2013 | Li | ......... | H02J 3/381 363/127 |
| 2014/0062432 A1* | 3/2014 | Goto | ......... | G05F 1/10 323/271 |
| 2014/0277283 A1* | 9/2014 | Reinke | ......... | A61N 1/36125 607/59 |
| 2015/0061613 A1* | 3/2015 | Kondou | ......... | H02M 3/158 323/271 |
| 2015/0180355 A1* | 6/2015 | Freeman | ......... | H02M 1/12 363/21.04 |
| 2015/0357912 A1* | 12/2015 | Perreault | ......... | H02M 1/4208 363/126 |
| 2016/0036332 A1* | 2/2016 | Yashiki | ......... | H02M 3/1582 323/271 |
| 2016/0268892 A1* | 9/2016 | Gupta | ......... | H02M 3/07 |
| 2017/0264192 A1* | 9/2017 | Junmin | ......... | H02M 3/07 |
| 2017/0338735 A1* | 11/2017 | Alarcon-Cot | ......... | H02M 1/4225 |
| 2017/0353116 A1* | 12/2017 | Zhang | ......... | H02M 3/073 |
| 2018/0026526 A1* | 1/2018 | Ahmed | ......... | H02M 3/1584 323/271 |
| 2018/0097486 A1* | 4/2018 | Salem | ......... | H03F 3/2173 |
| 2018/0166902 A1* | 6/2018 | Huang | ......... | H02J 7/00 |
| 2020/0119646 A1* | 4/2020 | Zhu | ......... | H02M 3/335 |
| 2020/0280253 A1* | 9/2020 | Sakamaki | ......... | H02M 3/1582 |
| 2020/0350817 A1* | 11/2020 | De | ......... | H02M 3/155 |
| 2021/0211552 A1* | 7/2021 | Umimura | ......... | H04N 1/00885 |
| 2021/0242771 A1* | 8/2021 | Chen | ......... | H02J 7/0068 |

FOREIGN PATENT DOCUMENTS

| | | | | |
|---|---|---|---|---|
| JP | 2016-154439 A | | 8/2016 | |
| WO | WO-2006070524 A1 | * | 7/2006 | ............. H02M 3/07 |
| WO | WO-2017217249 A1 | * | 12/2017 | ............. H02M 3/07 |

\* cited by examiner

| | INPUT VOLTAGE OF POWER SOURCE 102 | VOLTAGE DIVISION RATIO OF FIRST DC/DC CONVERTER 105 |
|---|---|---|
| SECTION a | 2.5-5.2V | 1 : 1 |
| SECTION b | 5.2-7.8V (*5.2V IS NOT INCLUDED) | 1 : 2 |
| SECTION c | 7.8-13.5V (*7.8V IS NOT INCLUDED) | 1 : 3 |

| INPUT VOLTAGE OF POWER SOURCE 102 | | VOLTAGE DIVISION RATIO OF FIRST DC/DC CONVERTER 105 |
|---|---|---|
| REPRODUCTION MODE, LIVE VIEW MODE | MOVING IMAGE RECORDING MODE | |
| SECTION a: 2.5-5.2V | SECTION A: 2.7-5.4V | 1 : 1 |
| SECTION b: 5.2-7.8V (*5.2V IS NOT INCLUDED) | SECTION B: 5.4-8.1V (*5.4V IS NOT INCLUDED) | 1 : 2 |
| SECTION c: 7.8-13.5V (*7.8V IS NOT INCLUDED) | SECTION C: 8.1-13.5V (*8.1V IS NOT INCLUDED) | 1 : 3 |

ELECTRONIC DEVICE AND CONTROL METHOD FOR GENERATING AN OUTPUT VOLTAGE FROM AN INPUT VOLTAGE

BACKGROUND

Field of the Invention

Aspects of the disclosure generally relate to an electronic device having a voltage conversion circuit for converting an input voltage into a predetermined output voltage and a method of controlling such an electronic device.

Description of the Related Art

Japanese Patent Laid-Open No. 2016-154439 discloses a DC/DC converter having a switched capacitor circuit, in which an output voltage determined for each mode is set, and an output voltage is changed by a change in mode.

However, in Japanese Patent Laid-Open No. 2016-154439, when the input voltage to the DC/DC converter changes, the output voltage changes. Since the fluctuations of the output voltage of the DC/DC converter increase as the load current of the DC/DC converter increases, the fluctuations of the output voltage of the DC/DC converter may affect the operation of the device having the DC/DC converter.

SUMMARY

According to an aspect of the embodiments, there is provided a device, a method or the like for reducing an influence on an operation of a device.

According to an aspect of the embodiments, there is provided an electronic device comprising: a first voltage conversion unit that divides an input voltage and outputs the divided voltage; a detection unit that detects the input voltage; and a control unit that controls the voltage division ratio of the first voltage conversion unit such that the output voltage of the first voltage conversion unit decreases as the input voltage increases.

According to an aspect of the embodiments, there is provided a method comprising: causing a voltage conversion unit of an electronic device to divide an input voltage and output the divided voltage; causing a detection unit of the electronic device to detect the input voltage; and controlling the voltage division ratio of the voltage converting unit such that the output voltage of the voltage converting unit decreases as the input voltage increases.

Further aspects of the embodiments will become apparent from the following embodiments.

DESCRIPTION OF THE EMBODIMENTS

Exemplary embodiments, features, and aspects of the disclosure will be described below with reference to the drawings. However, aspects of the disclosure are not limited to the following embodiments.

First Embodiment

Figure 1:
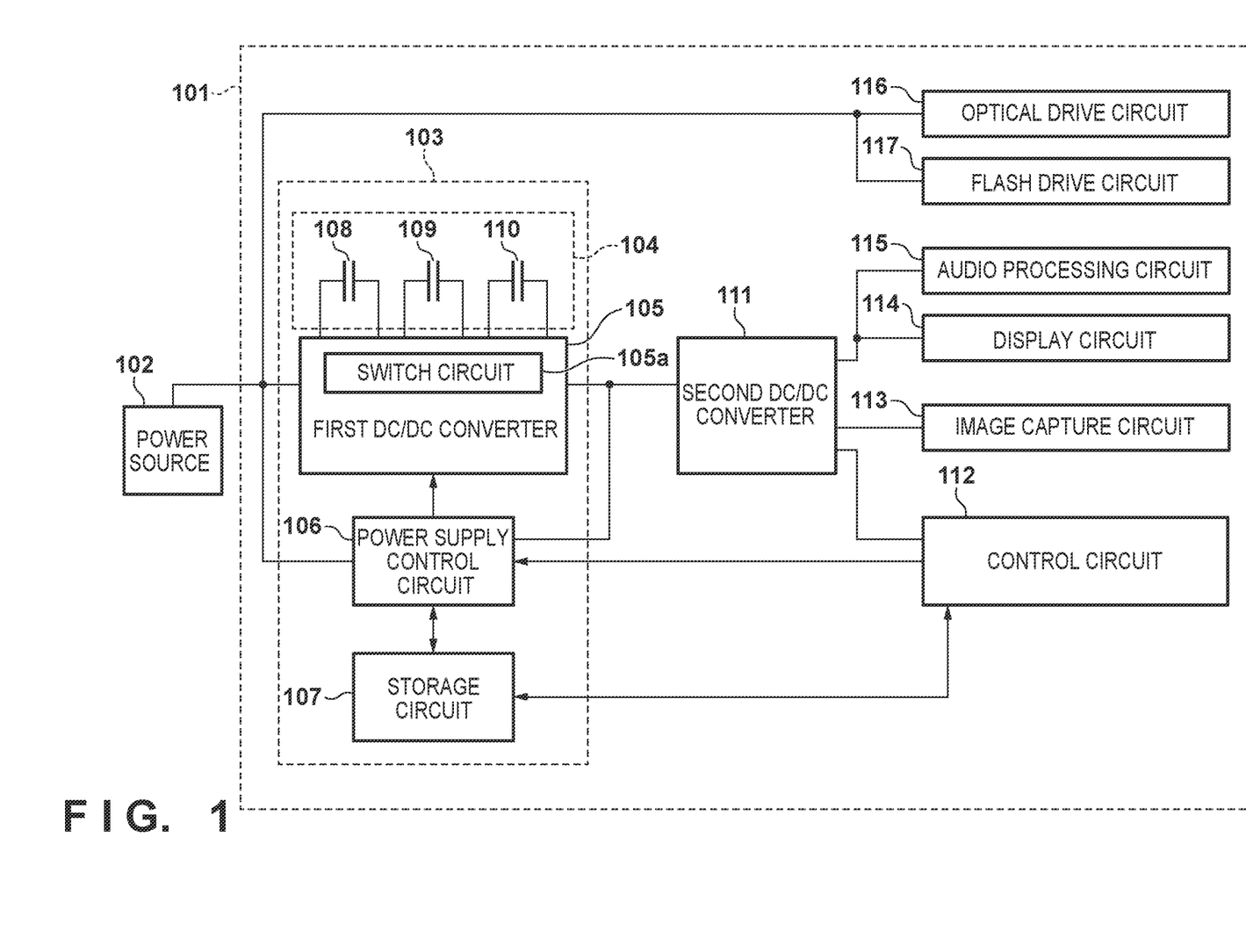
FIG. 1 is a block diagram illustrating an example of components of an electronic device 101 according to first and second embodiments.

Referring to FIG. 1, an example of configurations of the electronic device 101 provided with the power supply device 103 according to the first embodiment will be described. However, the components of the electronic device 101 are not limited to the components shown in FIG. 1. The electronic device 101 can operate as any one or at least one of an image capture device (e.g., a digital camera), a mobile phone (e.g., a smartphone), and a mobile terminal (e.g., a tablet terminal).

A power source 102 is a home 100V power source or the like that can be connected by a battery, a plug, or a cable (e.g., USB) that supplies a power to the electronic device 101.

A power supply device 103 includes a capacitor circuit 104, a first DC/DC converter 105, a power supply control circuit 106, and a memory circuit 107.

The capacitor circuit 104 includes three or more capacitors 108, 109, and 110.

The first DC/DC converter 105 is a voltage conversion circuit operable as a switched capacitor circuit. The first DC/DC converter 105 can convert the input voltage Vin into an output voltage Vout corresponding to a voltage in which the input voltage Vin is divided by integer. The input voltage Vin is the input voltage of the power supply device 103, and the output voltage Vout is the output voltage of the first DC/DC converter 105 of the power supply device 103.

The first DC/DC converter 105 can switch charging or discharging of the capacitor circuit 104 at a predetermined frequency.

The first DC/DC converter 105 controls charging and discharging of the capacitor circuit 104 by switching a switch circuit 105a to an ON state or an OFF state, and generates, from the input voltage Vin from the power source 102, an output voltage Vout in which the input voltage Vin is divided by integer. Furthermore, the first DC/DC converter 105 can output the input voltage Vin of the power source 102 without converting the input voltage Vin.

The power supply control circuit 106 controls the switch circuit 105a of the first DC/DC converter 105 to be turned on or off based on the input voltage Vin of the power source 102 and the voltage division ratio stored in storage circuit 107. The switch circuit 105a includes a switch connected to the capacitor 108, a switch connected to the capacitor 109, and a switch connected to the capacitor 110.

The storage circuit 107 is, for example, a ROM, and stores voltage division information indicating the relationship between the input voltage Vin of the power source 102 and the voltage division ratio of the first DC/DC converter 105.

A second DC/DC converter 111 is a voltage conversion circuit that generates a voltage necessary for each component of the electronic device 101 using the output voltage Vout converted by the first DC/DC converter 105 as an input voltage. In the first embodiment, the second DC/DC converter 111 generates a voltage required in a control circuit 112, an image capture circuit 113, a display circuit 114, and an audio processing circuit 115, which will be described later.

The control circuit 112 includes an arithmetic processing circuit and controls all the components of the electronic device 101.

The image capture circuit 113 drives a photoelectric conversion element such as a CCD or a CMOS included in the image sensor, and generates image data from an optical image of an object formed on the image sensor via an optical system (not shown).

The display circuit 114 generates display data for displaying image data including a live view generated by the image capture circuit 113, various information of the electronic device 101, a GUI (Graphical User Interface), or the like on the display unit.

The audio processing circuit 115 generates audio data from sound collected by a microphone or the like in a moving image recording mode or the like, or generates audio data to be output to a speaker or the like in a reproduction mode.

An optical driving circuit 116 drives an optical system including a lens, a shutter, an aperture, or the like in accordance with various imaging parameters.

A flash drive circuit 117 drives a flash in accordance with a brightness of the object to emit light.

In the first embodiment, power to the optical drive circuit 116 and the flash drive circuit 117 is directly supplied from the power source 102.

Figure 2A:
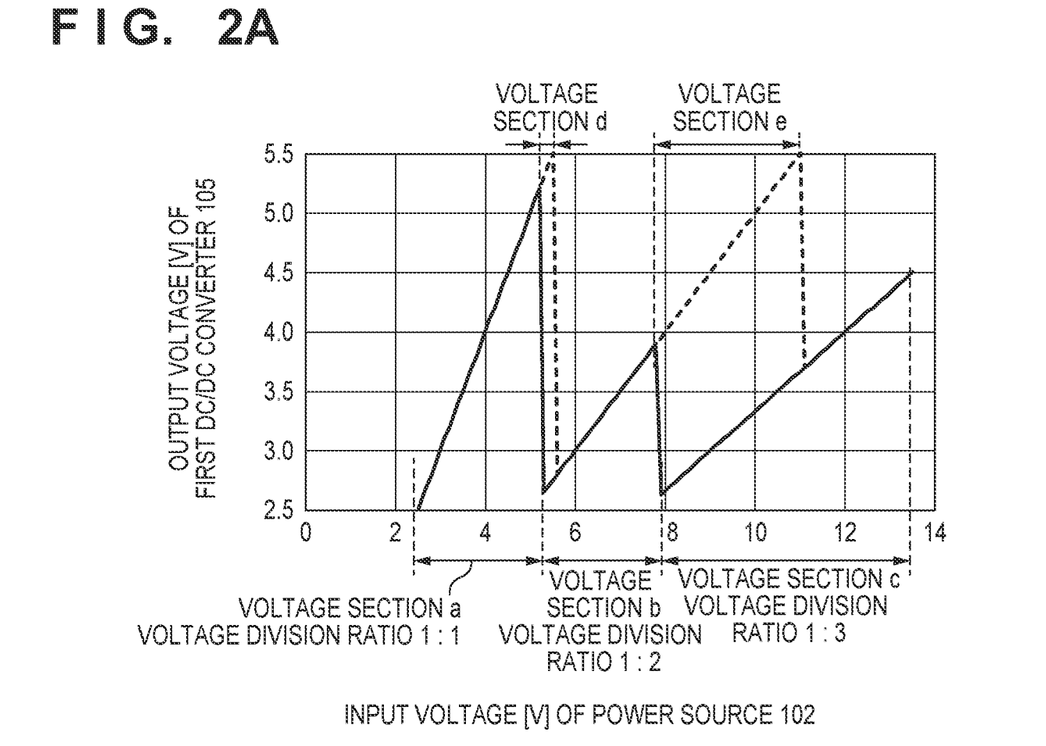
FIG. 2A is a diagram illustrating an example of a relationship between an input voltage and an output voltage to a power supply device 103.
Figure 2B:
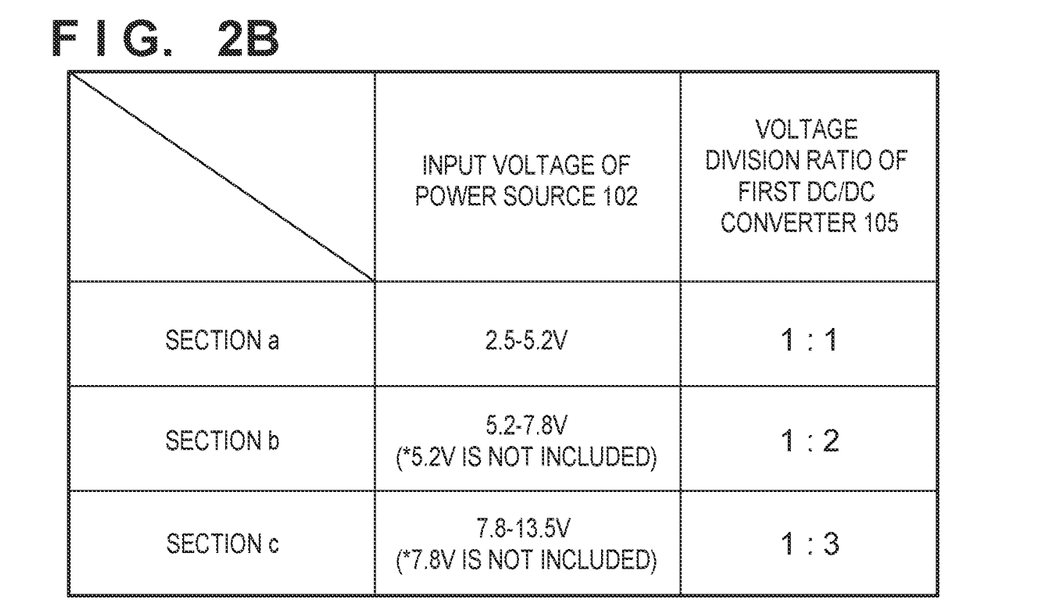
FIG. 2B is a diagram illustrating an example of a relationship between an input voltage to the power supply device 103 and a voltage division ratio of a first DC/DC converter 105.

FIG. 2A is a diagram illustrating an example of the relationship between the input voltage Vin of the power source 102 and the output voltage Vout of the first DC/DC converter 105 in the first embodiment. FIG. 2B is a diagram illustrating an example of the voltage division information indicating the relationship between the input voltage Vin of the power source 102 and the voltage division ratio of the first DC/DC converter 105.

The horizontal axis of FIG. 2A represents the input voltage Vin of the power source 102. The vertical axis of FIG. 2A represents the output voltage Vout of the first DC/DC converter 105. A voltage value indicated by a solid line in FIG. 2A indicates the relationship between the output voltage Vout and the input voltage Vin of the power source 102 according to the voltage division ratio of the first DC/DC converter 105 in the first embodiment. A voltage value indicated by a dotted line in FIG. 2A indicates an operable input voltage of the second DC/DC converter 111 in the first embodiment. FIG. 2B shows the relationship between the voltage range of the power source 102 and the voltage division ratio of the first DC/DC converter 105 in the first embodiment.

In FIGS. 2A and 2B, the voltage division ratio between the input voltage Vin and the output voltage Vout is set to one to one (1:1) in a voltage section a of the input voltage Vin of the power source 102. In a voltage section b of the power source 102, the voltage division ratio between the input voltage Vin and the output voltage Vout is set to one to two (1:2). In a voltage section c of the power source 102, the voltage division ratio between the input voltage Vin and the output voltage Vout is set to one to three (1:3). In this way, the voltage division ratio of the first DC/DC converter 105 is set such that the larger the input voltage Vin of the power source 102 is, the smaller the voltage division ratio of the first DC/DC converter 105 is, and the smaller the output voltage Vout of the first DC/DC converter 105 is.

The voltage division ratio is set such that the power efficiency (output power/input power) of the second DC/DC converter 111 using the output voltage Vout of the first DC/DC converter 105 as the input voltage becomes high. For example, in a case where the second DC/DC converter 111 can operate at an input voltage of 2.5V to 5.5V, the smaller the input voltage, the higher the power efficiency of the second DC/DC converter 111. Therefore, when there are operable input voltages of the second DC/DC converter 111 as shown in a voltage section d and a voltage section e of FIG. 2A, the voltage division ratio is set such that the input voltage of the second DC/DC converter 111 becomes small and the power efficiency becomes high.

As shown in FIG. 2B, the storage circuit 107 stores voltage division information indicating the relationship between the voltage range of the power source 102 and the voltage division ratio of the first DC/DC converter 105.

Next, an example of process 300 performed by the power supply device 103 according to the first embodiment will be described with reference to a flowchart of FIG. 3.

Figure 3:
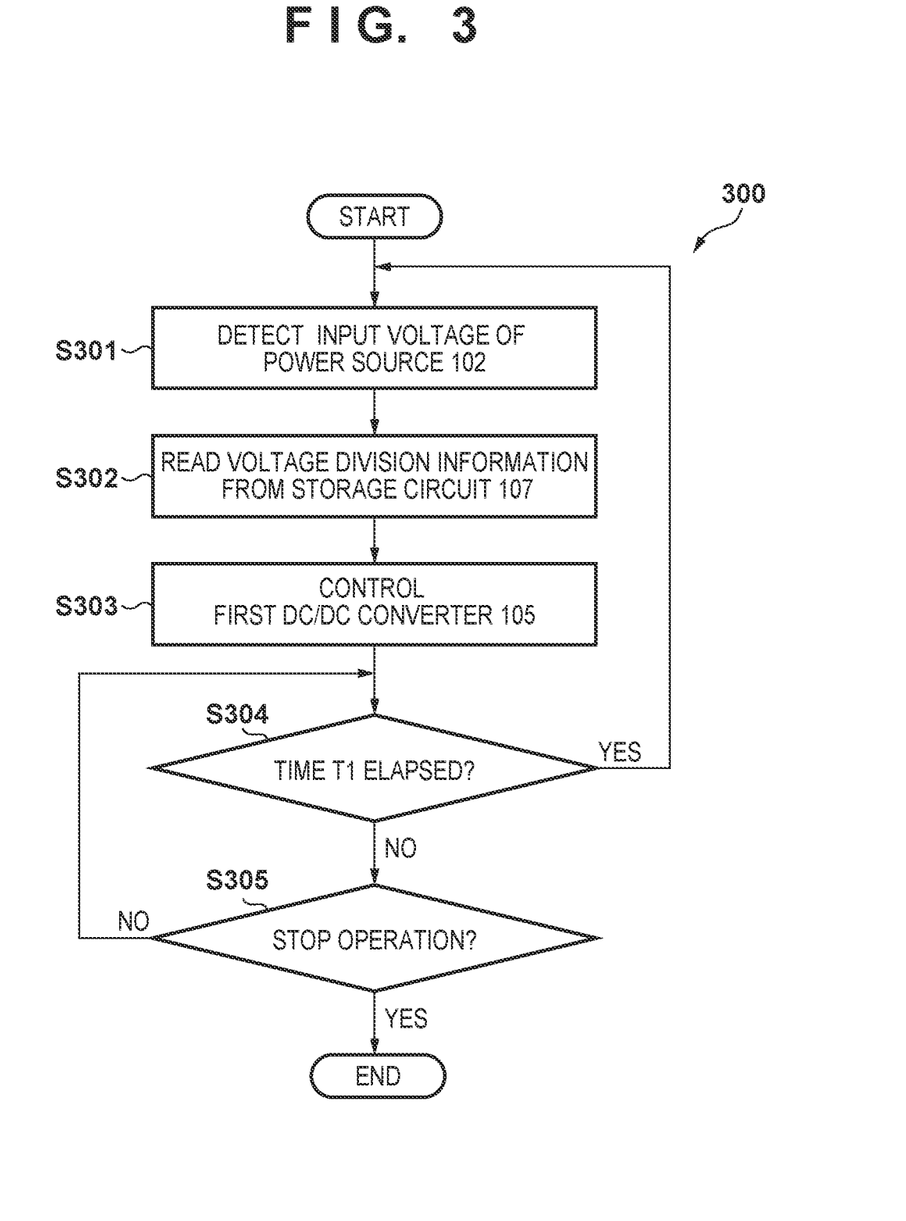
FIG. 3 is a flowchart illustrating an example of process 300 performed by the power supply device 103.

FIG. 3 is a flowchart showing the process 300 performed by the power supply device 103 according to the first embodiment.

The process 300 of FIG. 3 is realized by the power supply control circuit 106 executing a program stored in the storage circuit 107 to control each component of the power supply device 103.

In step S301, when the electronic device 101 is powered on, the power control circuit 106 detects the voltage value of the input voltage Vin of the power source 102.

In step S302, the power supply control circuit 106 reads the voltage division information from the storage circuit 107, and determines the voltage division ratio of the first DC/DC converter 105 according to the input voltage Vin detected in step S301.

In step S303, the power supply control circuit 106 controls the on/off state of the switch circuit 105a of the first DC/DC converter 105 so as to achieve the voltage division ratio determined in step S302.

The power supply control circuit 106 controls the switch circuit 105a in accordance with the voltage division ratio of the first DC/DC converter 105 as follows.
i) In a case where the voltage division ratio is controlled to one to two (1:2), the switches connected to the capacitors 108 and 109 are controlled.
ii) In a case where the voltage division ratio is controlled to be one to three (1:3), switches connected to the capacitor 108, the capacitor 109, and the capacitor 110 are controlled.
iii) In a case where the voltage division ratio is controlled to one to one (1:1), the switch connected between the power source 102 and the power supply line of the second DC/DC converter 111 is turned on to output the voltage of the power source 102 as it is.

In step S304, the power supply control circuit 106 operates a timer circuit (not shown), and repeats the processes of steps S301 to S303 at predetermined time t1.

In step S305, when the power of the electronic device 101 is turned off, the power control circuit 106 stops the operation and ends the process.

According to the first embodiment, the voltage division ratio of the first DC/DC converter 105 is controlled such that the output voltage Vout of the first DC/DC converter 105 decreases as the input voltage Vin of the power source 102 increases. By performing such control, it is possible to reduce the influence on the operation of the device due to the fluctuations of the output voltage Vout of the first DC/DC converter 105.

Second Embodiment

Next, the electronic device 101 according to the second embodiment will be described with reference to FIGS. 4 and 5.

FIG. 1 shows components of the electronic device 101 according to the second embodiment. The components of the electronic device 101 according to the second embodiment are the same as those of the electronic device 101 according to the first embodiment.

The electronic device 101 according to the second embodiment can be switched to any one of a reproduction mode, a live view mode, and a moving image recording mode in response to a user operation. The reproduction mode is a mode in which a captured still image, an operation menu of the electronic device 101, or the like are displayed on the display circuit 114. The live view mode is a mode in which image data generated by the image capture circuit 113 is output to the display circuit 114 in real time and displayed. The moving image recording mode is a mode in which a moving image generated by the image capture circuit 113 is recorded in a predetermined file format.

Figure 4A:
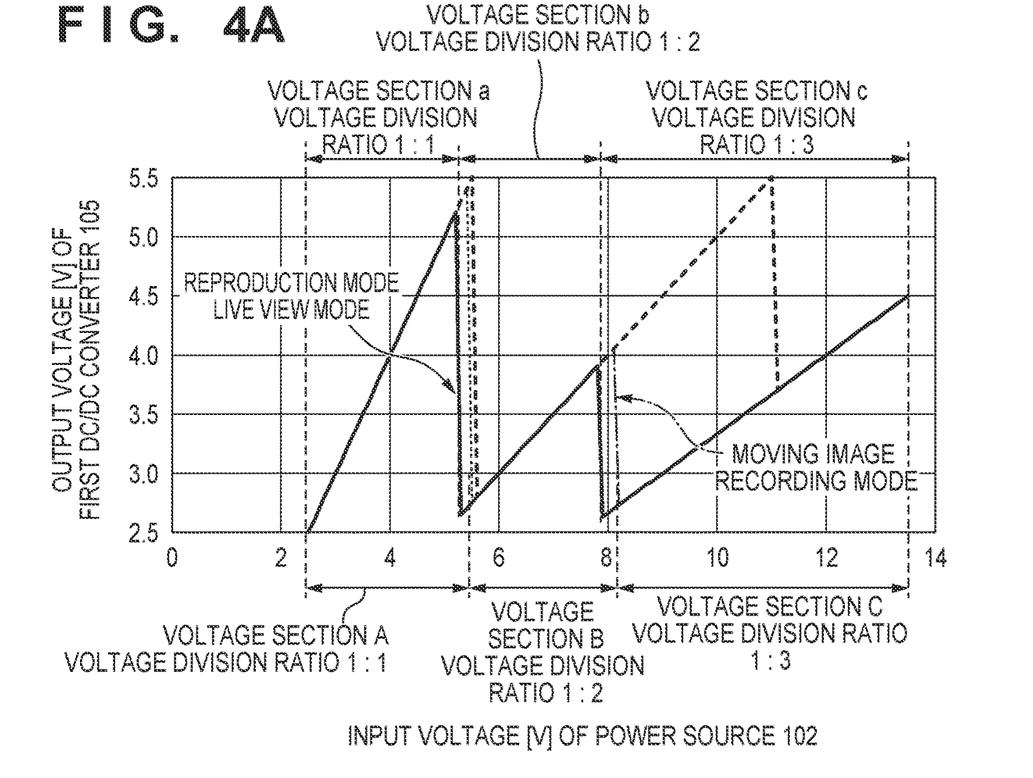
FIG. 4A is a diagram illustrating an example of a relationship between an input voltage and an output voltage to the power supply device 103.

FIG. 4A is a diagram illustrating an example of the relationship between the input voltage Vin of the power source 102 and the output voltage Vout of the first DC/DC converter 105 for each operation mode of the electronic device 101 according to the second embodiment. FIG. 4B is a diagram illustrating an example of the voltage division information indicating the relationship between the input voltage Vin of the power source 102 and the voltage division ratio of the first DC/DC converter 105.

The horizontal axis of FIG. 4A represents the input voltage Vin supplied from the power source 102 to the first DC/DC converter 105. The vertical axis of FIG. 4A represents the output voltage Vout of the first DC/DC converter 105. In the second embodiment, the voltage value indicated by the solid line in FIG. 4A indicates the relationship between the output voltage Vout and the input voltage Vin of the power source 102 according to the voltage division ratio of the first DC/DC converter 105 in the reproduction mode or the live view mode of the electronic device 101. A voltage value indicated by a dashed line in FIG. 4A indicates the relationship between the output voltage Vout and the input voltage Vin of the power source 102 according to the voltage division ratio of the first DC/DC converter 105 in the moving image recording mode of the electronic device 101 in the second embodiment. A voltage value indicated by a dotted line in FIG. 4A indicates an operable input voltage of the second DC/DC converter 111 in the second embodiment. FIG. 4B shows the relationship among the operation mode of the electronic device 101 according to the second embodiment, the voltage range of the power source 102, and the voltage division ratio of the first DC/DC converter 105.

Figure 4B:
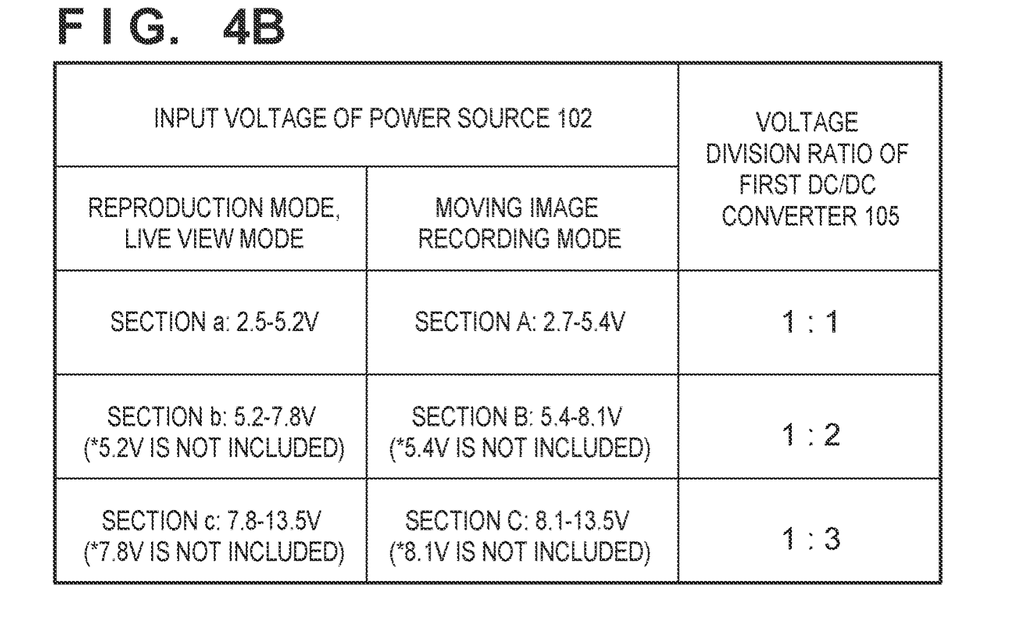
FIG. 4B is a diagram illustrating an example of a relationship between the input voltage input to the power supply device 103 and the voltage division ratio of the first DC/DC converter 105.

In a case where the operation mode of the electronic device 101 is the reproduction mode or the live view mode, in FIGS. 4A and 4B, the voltage division ratio is set to one to one (1:1) in a voltage section a of the input voltage Vin of the power source 102, the voltage division ratio is set to one to two (1:2) in a voltage section b, and the voltage division ratio is set to one to three (1:3) in a voltage section c.

In a case where the operation mode of the electronic device 101 is the moving image recording mode, in FIG. 4A, the voltage division ratio is set to one to one (1:1) in a voltage section A of the input voltage Vin of the power source 102, the voltage division ratio is set to one to two (1:2) in a voltage section B, and the voltage division ratio is set to one to three (1:3) in a voltage section C.

In a case where the output voltage Vout of the first DC/DC converter 105 varies, the ripple voltage Vrip, which is the output voltage Vout of the first DC/DC converter 105, can be expressed by Equation 1. In Equation 1, the load current is Iload, the switching frequency is fsw, the capacitance of the capacitor circuit 104 is Cout, and the series resistance component of the capacitor circuit 104 is ESRcout.

$$Vrip = Iload/(2 \times fsw \times Cout) + (2 \times Iload \times ESRcout) \quad \text{(Equation 1)}$$

From Equation 1, the ripple voltage Vrip of the first DC/DC converter 105 increases as the load current Iload increases.

For example, in the moving image recording mode, a power consumption of the control circuit 112, the image capture circuit 113, or the audio processing circuit 115, which is a load of the electronic device 101, is increased. Therefore, in the moving image recording mode, the load currents of the first DC/DC converter 105 and the second DC/DC converter 111 are larger than those in the reproduction mode or the live view mode. Even in such a case, it is necessary to prevent the minimum value of the ripple voltage Vrip of the first DC/DC converter 105 from falling below the minimum value (for example, 2.5 V) of the operable input voltage of the second DC/DC converter 111.

Therefore, the lower limit of the input voltage Vin of the power source 102 at which the voltage division ratio of the first DC/DC converter 105 is switched in the moving image recording mode is set to be larger than the lower limit of the input voltage Vin of the power source 102 in the reproduction mode or the live view mode. The lower limit of the input voltage Vin of the power source 102 at which the voltage division ratio of the first DC/DC converter 105 is switched in the moving image recording mode corresponds to the section A: 2.7 V, the section B: 5.4 V, and the section C: 8.1 V in FIG. 4B. In the reproduction mode or the live view mode, the lower limit of the input voltage Vin of the power source 102 corresponds to a section a of 2.5 V, a section b of 5.2 V, and a section c of 7.8 Vin FIG. 4B.

As shown in FIG. 4B, the storage circuit 107 stores the voltage division information indicating the relationship between the voltage range of the power source 102 and the voltage division ratio of the first DC/DC converter 105 for each operation mode of the electronic device 101. The voltage division ratio of the first DC/DC converter 105 is set to decrease as the input voltage Vin of the power source 102 increases and the load currents of the first DC/DC converter 105 and the second DC/DC converter 111 increase.

Next, an example of process 500 performed by the power supply device 103 according to the second embodiment will be described with reference to a flowchart of FIG. 5.

Figure 5:
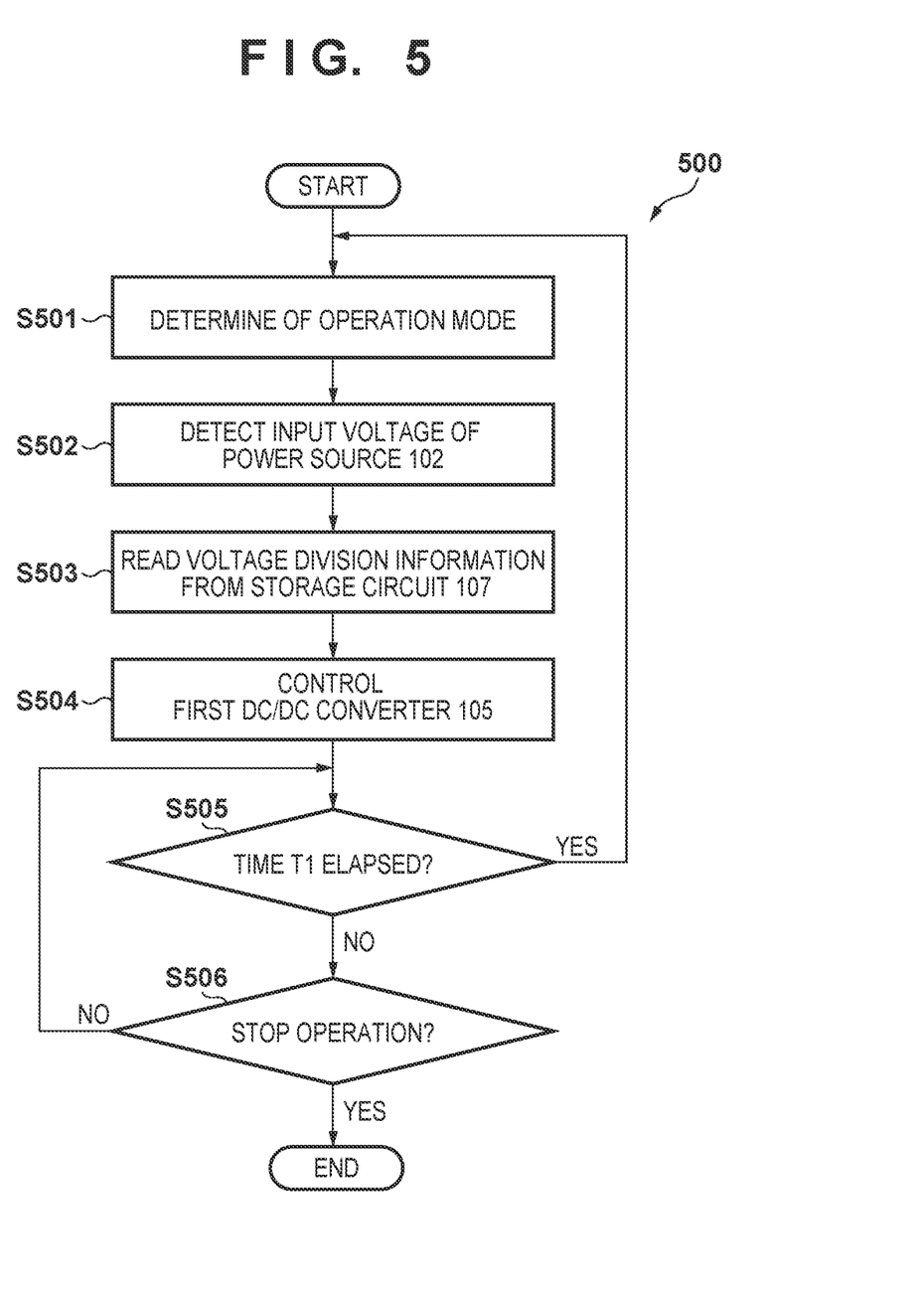
FIG. 5 is a flowchart illustrating an example of process 500 performed by the power supply device 103.

FIG. 5 is a flowchart showing the process 500 performed by the power supply device 103 according to the second embodiment.

The process 500 of FIG. 5 is realized by the power supply control circuit 106 executing a program stored in the storage circuit 107 to control each component of the power supply device 103.

In step S501, when the electronic device 101 is powered on, the control circuit 112 determines the operation mode of the electronic device 101 and notifies the power control circuit 106 of the determination result.

In step S502, when the electronic device 101 is powered on, the power control circuit 106 detects the voltage value of the input voltage Vin of the power source 102.

In step S503, the power supply control circuit 106 reads the voltage division information from the storage circuit 107. Then, the power supply control circuit 106 determines the voltage division ratio of the first DC/DC converter 105 according to the operation mode of the electronic device 101 notified from the control circuit 112 in step S501 and the input voltage Vin of the power source 102 detected in step S502.

For example, in a case where the operation mode of the electronic device 101 is determined to be the moving image recording mode in step S501 and the input voltage Vin detected in step S502 is 8.1 V, the voltage division ratio is determined to be one to two (1:2) from FIG. 4B.

For example, in a case where the operation mode of the electronic device 101 is determined to be the live view mode in step S501 and the input voltage Vin detected in step S502 is 8.1 V, the voltage division ratio is determined to be one to three (1:3) from FIG. 4B.

In step S504, the power supply control circuit 106 controls the on/off state of the switch circuit 105a of the first DC/DC converter 105 so as to achieve the voltage division ratio determined in step S503.

The power supply control circuit 106 controls the switch circuit 105a in accordance with the voltage division ratio of the first DC/DC converter 105 as follows.

i) In a case where the voltage division ratio is controlled to one to two (1:2), the switches connected to the capacitors 108 and 109 are controlled.
ii) In a case where the voltage division ratio is controlled to be one to three (1:3), switches connected to the capacitor 108, the capacitor 109, and the capacitor 110 are controlled.
iii) In a case where the voltage division ratio is controlled to one to one (1:1), the switch connected between the power source 102 and the power supply line of the second DC/DC converter 111 is turned on to output the voltage of the power source 102 as it is.

In step S505, the power supply control circuit 106 operates a timer circuit (not shown), and repeats the processes of steps S501 to S504 at predetermined time t1.

In step S506, when the power of the electronic device 101 is turned off, the power control circuit 106 stops the operation and ends the process.

According to the second embodiment, the voltage division ratio of the first DC/DC converter 105 is controlled so that the output voltage Vout of the first DC/DC converter 105 decreases as the input voltage Vin of the power source 102 increases in accordance with the operation mode of the electronic device 101. By performing such control, it is possible to reduce the influence on the operation of the device due to the fluctuations of the output voltage Vout of the first DC/DC converter 105.

In the second embodiment, as shown in FIG. 4B, the memory circuit 107 stores the relationship between the voltage range of the power source 102 and the voltage division ratio of the first DC/DC converter 105 for each operation mode of the electronic device 101. On the other hand, the difference in the voltage range of the power source 102 between the modes may be stored as the offset value. In this case, for example, the storage circuit 107 stores the voltage division ratios of the voltage sections a, b, and c of the power source 102 and the first DC/DC converter 105 in the reproduction mode and the live view mode shown in FIG. 4B. In the moving image recording mode, the voltage section A may store an offset value of 0.2 V with respect to the voltage section a, and the voltage section B may store an offset value of 0.2 V at minimum and 0.3 V at maximum with respect to the voltage section b. The voltage section C may store an offset value of MIN 0.3 V at a minimum with respect to the voltage section c.

Third Embodiment

Various kinds of functions, processes, or methods described in the first and second embodiments can also be realized by a personal computer, a microcomputer, a CPU (Central Processing Unit), or the like with a program. In a third embodiment, a personal computer, a microcomputer, a CPU, or the like will be called a "computer X" below. Also, in the third embodiment, a program for controlling the computer X and realizing various kinds of functions, processes, or methods described in the first and second embodiments will be called a "program Y".

Various kinds of functions, processes, or methods described in the first and second embodiments are realized by the computer X executing the program Y. In this case, the program Y is supplied to the computer X via a computer-readable storage medium. The computer-readable storage medium according to the third embodiment includes at least one of a hard disk device, a magnetic storage device, an optical storage device, a magneto-optical storage device, a memory card, a volatile memory (e.g., random access memory), a non-volatile memory (e.g., read only memory), or the like. The computer-readable storage medium according to the third embodiment is a non-transitory storage medium.

While aspects of the disclosure are described with reference to exemplary embodiments, it is to be understood that the aspects of the disclosure are not limited to the exemplary embodiments. The scope of the following claims is to be accorded the broadest interpretation so as to encompass all such modifications and equivalent structures.

This application claims the benefit of Japanese Patent Application No. 2019-173406, filed Sep. 24, 2019, which is hereby incorporated by reference herein in its entirety.

What is claimed is:
1. An electronic device comprising:
A first voltage conversion circuit that generates a first output voltage from an input voltage based on a voltage division ratio;
a second voltage conversion circuit that receives the first output voltage from the first voltage conversion circuit and generates a second output voltage;
a CPU; and
a memory that stores information indicating a relationship between the input voltage and the voltage division ratio of the first voltage conversion circuit and a program which, when executed by the CPU, causes the CPU to function as:
a detection unit that detects the input voltage; and
a control unit that controls the voltage division ratio of the first voltage conversion circuit based on the input voltage detected by the detection unit and the information read out from the memory such that the voltage division ratio of the first voltage conversion circuit becomes smaller as the input voltage increases.

2. The electronic device according to claim 1, wherein the control unit controls the voltage division ratio of the first voltage conversion circuit such that the voltage division ratio of the first voltage conversion circuit becomes smaller and a power efficiency of the second voltage conversion circuit increases as the input voltage increases.

3. The electronic device according to claim 1, wherein the control unit controls the voltage division ratio of the first voltage conversion circuit based on the input voltage detected by the detection unit, the information read out from the memory and an operation mode of the electronic device.

4. The electronic device according to claim 3, wherein the control unit controls the voltage division ratio of the first voltage conversion circuit to decrease as load currents of the first voltage conversion circuit and the second voltage conversion circuit increase.

5. The electronic device according to claim 4, wherein the load current of the second voltage conversion circuit in a moving image recording mode is larger than the load current of the second voltage conversion circuit in a reproduction mode or a live view mode.

6. The electronic device according to claim 1, wherein the first voltage conversion circuit is operable as a switched capacitor circuit, and the first voltage conversion circuit is capable of generating the first output voltage by dividing the input voltage by an integer.

7. A method comprising:
    causing a first voltage conversion circuit of an electronic device to generate a first output voltage from an input voltage based on a voltage division ratio;
    causing a second voltage conversion circuit of the electronic device to receive the first output voltage from the first voltage conversion circuit and generate a second output voltage;
    detecting the input voltage;
    reading out information indicating a relationship between the input voltage and the voltage division ratio of the first voltage conversion circuit from a memory of the electronic device;
    controlling the voltage division ratio of the first voltage conversion circuit based on the detected input voltage and the information read out from the memory such that the voltage division ratio of the first voltage conversion circuit becomes smaller as the input voltage increases.

8. The electronic device according to claim 1, wherein the electronic device is an image capture device.

9. The electronic device according to claim 1, wherein the electronic device is a mobile device.

10. The method according to claim 7, wherein the controlling controls the voltage division ratio of the first voltage conversion circuit such that the voltage division ratio of the first voltage conversion circuit becomes smaller and a power efficiency of the second voltage conversion unit increases as the input voltage increases.

11. The method according to claim 7, wherein the controlling controls the voltage division ratio of the first voltage conversion circuit based on the detected input voltage, the information read out from the memory and an operation mode of the electronic device.

12. The method according to claim 11, wherein the controlling controls the voltage division ratio of the first voltage conversion circuit to decrease as load currents of the first voltage conversion circuit and the second voltage conversion circuit increase.

13. The method according to claim 12, wherein the load current of the second voltage conversion circuit in a moving image recording mode is larger than the load current of the second voltage conversion circuit in a reproduction mode or a live view mode.

14. The method according to claim 7, wherein the first voltage conversion circuit is operable as a switched capacitor circuit, and the first voltage conversion circuit is capable of generating the first output voltage by dividing the input voltage by an integer.

15. The method according to claim 7, wherein the electronic device is an image capture device.

16. The method according to claim 7, wherein the electronic device is a mobile device.

17. The electronic device according to claim 1, wherein the control unit controls the voltage division ratio of the first voltage conversion circuit to set the voltage division ratio of the first voltage conversion circuit to a first value if the input voltage is a first voltage in a first voltage section and sets the voltage division ratio of the first voltage conversion circuit to a second value smaller than the first value if the input voltage is a second voltage which is higher than the first voltage and is in a second voltage section of higher voltage than the first section.

18. The electronic device according to claim 1, wherein the second output voltage generated by the second voltage conversion circuit is supplied to at least one load, and
    wherein the memory is a circuit different from the at least one load.

19. The electronic device according to claim 1, wherein the memory is a ROM.

* * * * *